(12) United States Patent
Pajukoski et al.

(10) Patent No.: US 8,599,940 B2
(45) Date of Patent: Dec. 3, 2013

(54) APPARATUS, METHOD AND COMPUTER PROGRAM PRODUCT PROVIDING SEQUENCE MODULATION FOR UPLINK CONTROL SIGNALING

(75) Inventors: Kari Pajukoski, Oulu (FI); Esa Tiirola, Kempele (FI)

(73) Assignee: Nokia Corporation, Espoo (FI)

( * ) Notice: Subject to any disclaimer, the term of this patent is extended or adjusted under 35 U.S.C. 154(b) by 1235 days.

(21) Appl. No.: 11/904,509

(22) Filed: Sep. 26, 2007

(65) Prior Publication Data

US 2008/0075195 A1 Mar. 27, 2008

Related U.S. Application Data

(60) Provisional application No. 60/847,406, filed on Sep. 26, 2006.

(51) Int. Cl.
*H04L 27/28* (2006.01)

(52) U.S. Cl.
USPC .......................................................... 375/260

(58) Field of Classification Search
USPC ......... 375/130, 135, 139, 146, 260, 265, 267, 375/295; 370/208, 210
See application file for complete search history.

(56) References Cited

U.S. PATENT DOCUMENTS

| | | | | |
|---|---|---|---|---|
| 5,926,500 A * | 7/1999 | Odenwalder | ................. | 375/144 |
| 6,044,067 A | 3/2000 | Suzuki | ......................... | 370/252 |
| 7,457,230 B2 | 11/2008 | Ohkubo et al. | ............... | 370/208 |
| 7,606,193 B2 | 10/2009 | McFarland et al. | ........... | 370/329 |
| 7,701,919 B2 | 4/2010 | Ah Lee | ......................... | 370/344 |
| 7,715,845 B2 | 5/2010 | Jin et al. | ........................ | 455/447 |
| 8,036,166 B2 | 10/2011 | Tiirola et al. | .................. | 370/329 |
| 8,094,638 B2 * | 1/2012 | Muharemovic et al. | ....... | 370/344 |
| 8,351,392 B2 | 1/2013 | Ahn et al. | ..................... | 370/329 |
| 2003/0067961 A1 * | 4/2003 | Hudson et al. | ................ | 375/130 |
| 2004/0066802 A1 | 4/2004 | Ro et al. | ......................... | 370/528 |
| 2005/0111492 A1 | 5/2005 | Kang et al. | ..................... | 370/480 |
| 2006/0050799 A1 * | 3/2006 | Hou et al. | ...................... | 375/260 |
| 2006/0215603 A1 * | 9/2006 | Nishio et al. | .................. | 370/329 |
| 2006/0245472 A1 | 11/2006 | Pan et al. | ....................... | 375/144 |
| 2006/0264220 A1 | 11/2006 | Chen et al. | ..................... | 455/454 |
| 2006/0274842 A1 | 12/2006 | Pan et al. | ....................... | 375/260 |
| 2006/0291431 A1 | 12/2006 | Pajukoski et al. | ............... | 370/335 |

(Continued)

FOREIGN PATENT DOCUMENTS

| | | |
|---|---|---|
| WO | WO-98/04973 A1 | 2/1998 |
| WO | WO-02/33911 A1 | 4/2002 |

(Continued)

OTHER PUBLICATIONS

3GPP TS36.2,11 v1.2.1, "3$^{rd}$ Generation Partnership Project; Technical Specification Group Radio Access Network; Evolved Universal Terrestrial Radio Access (E-UTRA); Physical Channels and Modulation"; (Release 8) Jul. 2007.

(Continued)

*Primary Examiner* — Young T. Tse
(74) *Attorney, Agent, or Firm* — Harrington & Smith (57) ABSTRACT

A cyclically shifted sequence is provided. Information is modulated using a selected modulation coding scheme, multiplied with the cyclically shifted sequence, and mapped into at least one subcarrier and transmitting on an uplink.

27 Claims, 8 Drawing Sheets

(56) References Cited

U.S. PATENT DOCUMENTS

| | | | |
|---|---|---|---|
| 2007/0004465 A1 | 1/2007 | Papasakellariou et al. | 455/571 |
| 2007/0058595 A1 | 3/2007 | Classon et al. | 370/337 |
| 2007/0097927 A1 | 5/2007 | Gorokhov et al. | 370/335 |
| 2007/0097942 A1 | 5/2007 | Gorokhov et al. | 370/342 |
| 2007/0171995 A1 | 7/2007 | Muharemovic et al. | 375/260 |
| 2007/0183386 A1* | 8/2007 | Muharemovic et al. | 370/344 |
| 2007/0195906 A1 | 8/2007 | Kim et al. | 375/267 |
| 2007/0263529 A1 | 11/2007 | Ishikura et al. | 370/211 |
| 2008/0049708 A1 | 2/2008 | Khan et al. | 370/343 |
| 2008/0075184 A1* | 3/2008 | Muharemovic et al. | 375/260 |
| 2008/0101441 A1 | 5/2008 | Palanki et al. | 375/146 |
| 2008/0123616 A1* | 5/2008 | Lee | 370/344 |
| 2009/0149187 A1 | 6/2009 | Miki et al. | 455/450 |
| 2009/0227261 A1* | 9/2009 | Tiirola et al. | 455/450 |
| 2009/0279527 A1 | 11/2009 | Fukuoka et al. | 370/342 |
| 2009/0285327 A1* | 11/2009 | Iwai et al. | 375/295 |
| 2010/0002655 A1 | 1/2010 | Ofuji et al. | 370/335 |
| 2010/0002800 A1 | 1/2010 | Kim et al. | 375/295 |
| 2010/0046480 A1 | 2/2010 | Kawamura et al. | 370/335 |
| 2013/0129018 A1 | 5/2013 | Ko et al. | 375/296 |

FOREIGN PATENT DOCUMENTS

| | | |
|---|---|---|
| WO | WO 02/071770 A1 | 9/2002 |
| WO | WO-2007/084840 A2 | 7/2007 |
| WO | WO-2007/149290 A2 | 12/2007 |
| WO | WO-2008/155411 A1 | 12/2008 |

OTHER PUBLICATIONS

TSG-RAN WG1 LTE AdHoc; R1-061862; "Uplink Non-Data-Associated Control Signaling", Ericsson; Cannes, France; Jun. 27-30, 2006.

3GPP TSG Ran1 #46; R1-062065; "L1/L2 Uplink Control Mapping & Numerology", Motorola; Tallinn, Estonia; Aug. 28-Sep. 1, 2006.

3GPP TSG,RAN WG1 LTE Ad Hoc; R1-061674; "Single-Carrier Based Multiplexing of Uplink L1/L2 Control Channel", MTT DoCoMo, Fujitsu, NEC, Sharp, Toshiba Corporation; Cannes, France; Jun. 27-30, 2006.

3GPP TSG, RAN WG1 LTE Ad Hoc; R1-061675; "Data-Non-Associated L1/L2 Control Channel Structure for E-UTRA Uplink", NTT DoCoMo, Sharp, Toshiba Corporation; Cannes, France; Jun. 27-30, 2006.

3GPP RAN1 LTE Ad Hoc; R1-061699; "Uplink ACK/NACK Signaling: FDM vs. TDM", Samsung; Cannes, France; Jun. 27-30, 2006.

3GPP TSG RAN WG1 LTE Ad Hoc; R1-061779; "Multiplexing of Control Signaling in E-UTRA Uplink", LG Electronics; Cannes, France; Jun. 27-30, 2006.

3GPP TSG RAN1 LTE Ad Hoc; R1-061802; "Multiplexing and Link Analysis of CQI Channel in UL", Qualcomm Europe; Cannes, France; Jun. 27-30, 2006.

3GPP TR 25.814 v7.0.0, Section 9.1.1; "3$^{rd}$ Generation Partnership Project; Technical Specification Group Radio Access Network; Physical Layer Aspects for Evolved Universal Terrestrial Radio Access (UTRA)"; (Release 7) Jun. 2006.

TSG-RAN WG1; R1-080510; "Multiplexing of ACK/NACK and Scheduling Request on PUCCH", Ericsson; Sevilla, Spain; Jan. 14-28, 2008.

3GPP TSG RAN WG1 #42 on LTE; R1-050851; "Orthogonal Pilot Channel in the Same Node B in Evolved UTRA Uplink", NTT DoCoMo, NEC, Sharp; London, UK; Aug. 29-Sep. 2, 2005.

Xiaoming Peng et al.; "A Simplified Transceiver Structure for Cyclic Extended CDMA System with Frequency Domain Equalization", IEEE; Sep. 2005.

Guangliang Ren et al.; "Synchronization Method Based on a New Constant Envelop Preamble for OFDM Systems", IEEE Transactions on Broadcasting, vol. 51, No. 1, Mar. 2005; pp. 139-143.

Liru Le et al; "Extended Orthogonal Polyphase Codes for Multicarrier CDMA System", IEEE Communications Letters, vol. 8, No. 12, Dec. 2004; pp. 700-702.

"Multiplexing of control signalling in E-UTRA Uplink", 3GPP TSG RAN WG1 LTE Ad Hoc, R1-061779, Jun. 27-30, 2006, 5 pgs.

"On Allocation of Uplink Pilot Sub-Channels in EURA SC-FDMA", 3GPP TSG RAN WG1 Ad Hoc on LTE, R1-050822, Aug.-Sep. 2005, 7 pgs.

"Cubic Metric properties of CAZAC sequences", 3GPP TSG RAN WG1#45, R1-061284, May 2006, 4 pgs.

"Single-Carrier Based Multiplexing of Uplink L1/L2 Control Channel", 3GPP TSG RAN WG1 LTE Ad Hoc, R1-061674, Jun. 2006, 9 pgs.

"Coherent vs. non-coherent ACK/NAK signaling in E-UTRA uplink", 3GPP TSG RAN WG! Meeting #48, R1-070749, Feb. 2007, 7 pgs.

3GPP TR 25.814 V7.0.0 (Jun. 2006) "Multiplexing of L1/L2 Control Signaling", 3$^{rd}$ Generation Partnership Project; Technical Specification Group Radio Access Network; Physical layer aspects for evolved Universal Terrestrial Radio Access (UTRA) Release 7, p. 74.

Chang, Y. et al., "Synchronization Method Based on a New Constant Envelop Preamble for OFSM Systems", IEEE Transactions on Broadcasting, IEEE Service Center, Piscataway, NJ, US, vol. 51, No. 1, Mar. 2005, section III and IV.

Dubey, V. K. et al., Extended Orthogonal Polyphase Codes for Multicarrier CDMA System >>, IEEE Communications Letters, IEEE Service Center, Piscataway, NJ, US, vol. 8, No. 12, Dec. 2004, pp. 700-702, sections I, II, and V.

3GPP TS36.211 v1.2.1, "3$^{rd}$ Generation Partnership Project; Technical Specification Group Radio Access Network; Evolved Universal Terrestrial Radio Access (E-UTRA); Physical Channels and Modulation"; (Release 8) Jul. 2007.

3GPP TSG RAN WG1 LTE Ad Hoc; R1-061675; "Data-Non-Associated Li/L2 Control Channel Structure for E-UTRA Uplink", NTT DoCoMo, Sharp, Toshiba Corporation; Cannes, France; Jun. 27-30, 2006.

3GPP TSG RAN WG1#44bis, R1-060925: Comparison of Proposed Uplink Pilot Structures for SC-OFDMA, Agenda Item: 10.2.1, Athens, Greece, Mar. 27-31, 2006.

Langton, Charan, "Code Division Multiple Access (CDMA), The Concept of signal spreading and its uses in communications", 2002, 18 pgs.

Mottier, et al., "Spreading Sequence Assignment in the Downlink of OFCDM Systems Using Multiple Transmit Antennas"; Vehicular Technology Conference, 2004. VTC 2004-Spring. 2004 IEEE 59$^{th}$; May 17-19, 2004; 1461-1465 vol. 3 (5 pages).

http://www.utdallas.edu/~torlak/courses/ee4367/lectures/; EE/TE 4367 Telecommunications Switching & Transmission—Schedule; Prof. Murat Torlak, Spring 2008 Semester, TR 5:30-6:45 PM (15 pages).

Po-Ning Chen; http://shannon.cm.nctu.edu.tw/comtheory/; Chapter 7 Spread-Spectrum Modulation; Apr. 1, 2009 (25 pages).

* cited by examiner

| MCS NUMBER | MODULATION/CODING SCHEME | SPREADING FACTOR(SF) | BLOCK REPETITION FACTOR (BRF) | NUMBER OF BITS/1MS SUB-FRAME | # OF ORTHOGONAL USERS/1MS SUB-FRAME | PROCESSING GAIN |
|---|---|---|---|---|---|---|
| 1 | BPSK 1/3 | 12 | 2 | 2.0 | 6 | 13.8dB |
| 2 | QPSK 1/3 | 12 | 2 | 4.0 | 6 | 13.8dB |
| 3 | QPSK 1/3 | 12 | 1 | 8.0 | 6 | 10.8dB |
| 4 | QPSK 1/2 | 12 | 1 | 12.0 | 6 | 10.8dB |
| 5 | QPSK 1/1 | 12 | 1 | 24.0 | 6 | 10.8dB |
| 6 | 8PSK 1/1 | 12 | 1 | 32.0 | 6 | 10.8dB |
| 7 | 16QAM 1/1 | 12 | 1 | 48.0 | 6 | 10.8dB |

$$\begin{pmatrix}
1.0000-0.0000i & 0.8660-0.5000i & -0.5000-0.8660i & -0.0000+1.0000i & -0.5000-0.8660i & 0.8660-0.5000i \\
0.8660-0.5000i & 1.0000-0.0000i & 0.8660-0.5000i & -0.5000-0.8660i & -0.0000+1.0000i & -0.5000-0.8660i \\
-0.5000-0.8660i & 0.8660-0.5000i & 1.0000-0.0000i & 0.8660-0.5000i & -0.5000-0.8660i & -0.0000+1.0000i \\
-0.0000+1.0000i & -0.5000-0.8660i & 0.8660-0.5000i & 1.0000-0.0000i & 0.8660-0.5000i & -0.5000-0.8660i \\
-0.5000-0.8660i & -0.0000+1.0000i & -0.5000-0.8660i & 0.8660-0.5000i & 1.0000-0.0000i & 0.8660-0.5000i \\
0.8660-0.5000i & -0.5000-0.8660i & -0.0000+1.0000i & -0.5000-0.8660i & 0.8660-0.5000i & 1.0000-0.0000i
\end{pmatrix}$$

FIG. 9

APPARATUS, METHOD AND COMPUTER PROGRAM PRODUCT PROVIDING SEQUENCE MODULATION FOR UPLINK CONTROL SIGNALING

CROSS-REFERENCE TO RELATED APPLICATIONS

This patent application claims priority under 35 U.S.C. §119(e) from Provisional Patent Application No. 60/847,406 filed Sep. 26, 2006, the disclosure of which is incorporated by reference herein in its entirety.

TECHNICAL FIELD

The teachings in accordance with the exemplary and non-limiting embodiments of this invention relate generally to wireless communication systems, methods, devices and computer program products and, more specifically, relate to techniques for signaling control information from a user device to a wireless network device.

BACKGROUND

Certain abbreviations that may be found in the description and/or in the Figures are herewith defined as follows:
3GPP Third Generation Partnership Project
ACK acknowledgment
AMC adaptive modulation and coding
BER bit error rate
BPSK binary phase shift keying
BW bandwidth
CAZAC constant-amplitude zero auto-correlation
CDM code division multiplexing
CM cubic metric
CP cyclic prefix
CQI channel quality indicator
DFT-S-OFDMA discrete Fourier transform spread OFDM (SC-FDMA based on frequency domain processing)
E-UTRAN evolved UTRAN
FBI feedback information
FDM frequency division multiplexing
FDMA frequency division multiple access
FFT fast Fourier transform
HARQ hybrid automatic repeat request
IFDMA interleaved FDMA
IFFT inverse FFT
L1 Layer 1 (physical layer)
L2 Layer 2 (data link layer)
LB long block
LTE long term evolution
MCS modulation coding scheme
NACK negative ACK
Node-B Base Station
eNB EUTRAN Node B
OBO output backoff
OFDM Orthogonal Frequency Domain Multiplex
PAPR/PAR peak to average power ratio
PRB physical resource block
PSK phase shift keying
PUCCH physical uplink control channel
QAM quadrature amplitude modulation
QPSK quadrature phase shift keying
QoS quality of service
SB short block
SC-FDMA single carrier, frequency division multiple access
SF spreading factor
SINR signal-to-interference and noise ratio
TPC transmission power control
TTI transmission time interval
UE user equipment
UL uplink
UTRAN universal terrestrial radio access network
ZAC zero autocorrelation sequence A proposed communication system known as evolved UTRAN (E-UTRAN, also referred to as UTRAN-LTE) is currently under discussion within the 3GPP. The current working assumption is that the DL access technique will be OFDM, and the UL technique will be SC-FDMA.

Control channel multiplexing is performed in the UTRAN-LTE system, including control channel multiplexing in the SC-FDMA based UL. There are two different type of control signals to be carried in the UL:
1. Data associated control signaling including transport format and HARQ information. This information is associated with UL data transmissions.
2. Data-non-associated control signaling, such as CQI and/or ACK/NACK due to downlink transmissions.
Of particular interest to this discussion is the data-non-associated control signaling, the transmission of which may be divided into two separate classes:
a) data-non-associated control signaling multiplexed with UL data; and
b) data-non-associated control transmitted without UL data.
Reference in this regard may be had to 3GPP TR 25.814, v7.0, Section, 9.1.1.2.3, Multiplexing of L1/L2 control signaling, where it is stated that there are three multiplexing combinations for the uplinkpilot, data, and L1/L2 control signaling within a sub-frame that are considered for a single UE:
multiplexing of pilot, data, and data-associated L1/L2 control signaling;
multiplexing of pilot, data, and data-associated and data-non-associated L1/L2 control signaling; and
multiplexing of pilot and data-non-associated L1/L2 control signaling.

In single-carrier FDMA radio access, time-domain multiplexing is used for the above-mentioned three multiplexing combinations in order to retain the advantageous single-carrier feature with a low PAPR.

Both data-associated and data-non-associated control signaling are time-multiplexed with data and pilot within the sub-frame. Furthermore, the data-associated and data-non-associated control signaling from multiple UEs are multiplexed in the frequency or/and code domains associated with multiple pilot channels.

The data-non-associated control signaling can also be time-multiplexed with data if the UE has UL data transmission. Meanwhile, the data-non-associated control signaling, that transmits only the L1/L2 control, is multiplexed exclusively in a semi-statically assigned time-frequency region. This uplink control signaling is transmitted on a channel that can be referred to as a Physical Uplink Control Channel (PUCCH) in LTE terminology. The data-non-associated control signaling of different UEs is multiplexed using the frequency/time/code domain or a hybrid of them within the assigned time-frequency region. The exclusive time-frequency region can be separated into multiple separate frequency-time resources. The possibility for multiplexing of data-non-associated control signaling with data channel by exclusive frequency resource, i.e., frequency-multiplexing, is for further study.

Figure 1:
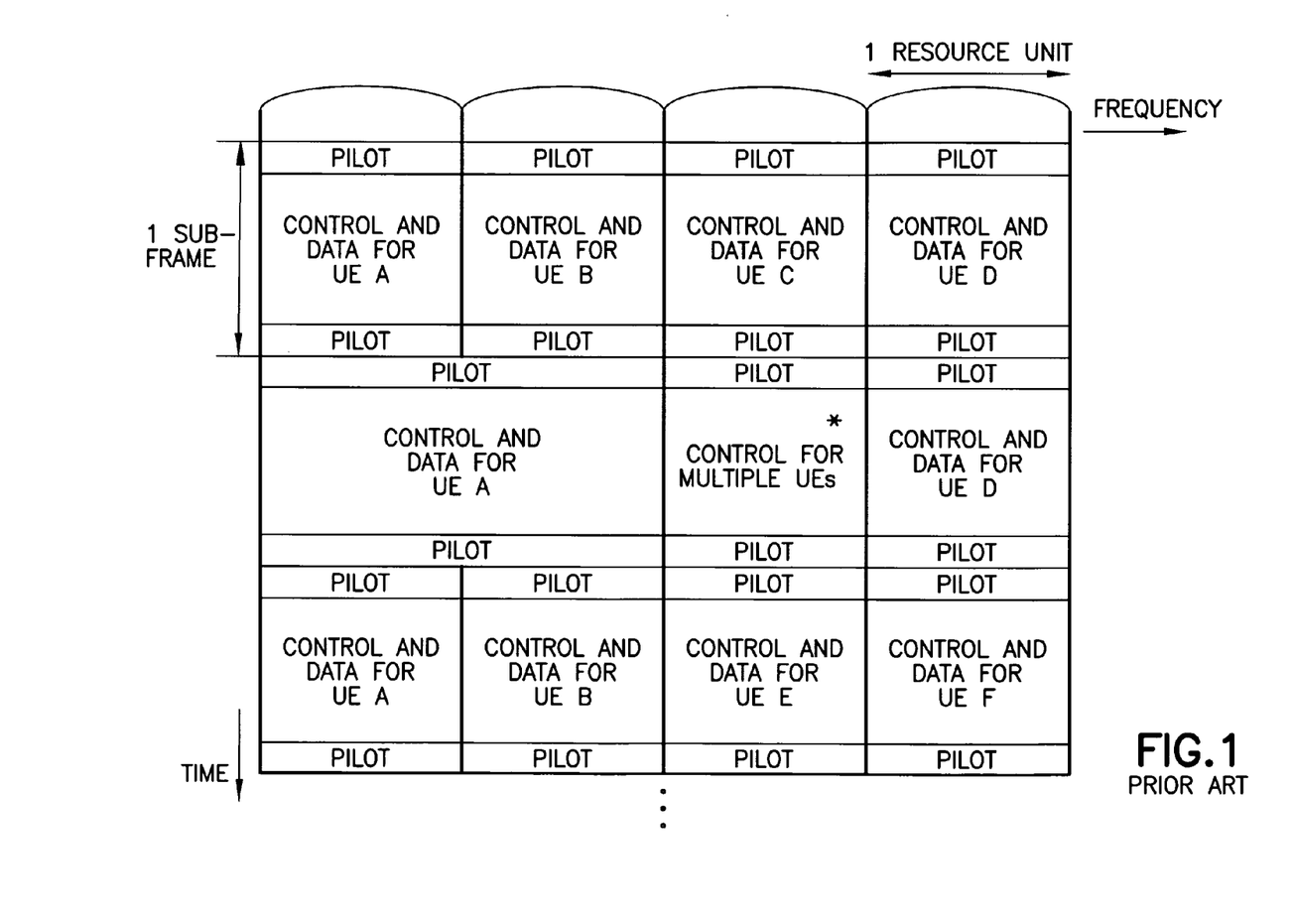
FIG. 1 reproduces a part of FIG. 9.1.1.23-2 of 3GPP TR25.814.

FIG. 1 herein reproduces a part of FIG. 9.1.1.23-2 of 3GPP TR25.814, "Multiplexing scheme for L1/L2 control signaling, data, and pilot", and assumes that data-non-associated control signaling for UEs that transmit only the L1/L2 control, is multiplexed exclusively in a semi-statically assigned time-frequency region (denoted with the asterisk in FIG. 1). On the contrary, UEs which have both UL data and data-non-associated control signaling utilize time-multiplexing between control and data.

It is important to note that data-non-associated control signaling transmitted in the UL presents special requirements for system design. In general, the transmitted information includes only a few information bits having tight delay requirements, and the ability to use re-transmissions is severely curtailed. Furthermore, the QoS requirement is stringent, e.g., for ACK/NACK signaling an error probability of the order of $10^{-2}$ or less is required. This indicates that frequency diversity is of high importance. In addition, maintaining the intra-cell orthogonality and low PAR properties of the SC-FDMA system should also be considered in the system design. Providing an optimized coverage area is also of importance.

Several contributions on data-non-associated channel multiplexing have been proposed thus far during the 3GPP standardization process for UTRAN-LTE.

For example, in R1-061862, "Uplink Non-data-associated Control Signaling": Ericsson, Jun. 27-30, 2006, it is proposed to have a new sub-frame format with an additional short block for data-non-associated control signaling. At least one perceived problem with this proposal, however, is that the scalability of the resource is less than optimum.

Also by example, in R1-062065, "L1/L2 UL Control Mapping and Numerology": Motorola, Aug. 28-Sep. 1, 2006, it is proposed to have a FDM-type of multiplexing combined with frequency hopping within a sub-frame. At least one perceived problem with this proposal is that the number of active sub-carriers is only two, which can lead to very high power differences between UEs occupying a large bandwidth. Thus, there is an increased probability that intra-cell orthogonality would be lost at least to some extent under practical transmission conditions, such as those where frequency and timing errors exist.

Additional related contributions include:
R1-061674, "Multiplexing Method of Uplink L1/L2 Control Channel", NTT DoCoMo;
R1-061675, "Data-non-associated L1/L2 Control Channel Structure for E-UTRA Uplink", NTT DoCoMo;
R1-061699, "Uplink ACK/NACK Signalling: FDM vs TDM", Samsung;
R1-061779, "Multiplexing of control signalling in E-UTRA", LG;
R1-061802, "Multiplexing and Link analysis of UL control channels", Qualcomm, respectively; and
3GPP TR 25.814, section 9.1.1 incorporated by reference.

These various proposals suggest the use of the same DFT-S-OFDMA modulation scheme for both data-non-associated control signaling and for data. However, a problem that arises is that DFT-S-OFDMA is not the most optimum modulation option for the intended purpose.

SUMMARY

In an exemplary aspect of the invention, there is a method comprising modulating information using a selected modulation coding scheme, multiplying the modulated information with a cyclically shifted sequence, and mapping the multiplied modulated information into at least one subcarrier and transmitting the mapped information on an uplink.

In another exemplary aspect of the invention, there is an apparatus comprising a transmitter, a sequence modulator coupled to the transmitter and comprising circuitry configurable to provide a cyclically shifted sequence, a modulator configurable to modulate information using a selected modulation coding scheme, a multiplier configurable to multiply the modulated information with the cyclically shifted sequence, and a mapper coupled to the transmitter configurable to map the multiplied modulated information into at least one subcarrier and transmit the mapped information on an uplink.

In another exemplary aspect of the invention, there is a computer readable medium encoded with a computer program executable by a processor to perform actions comprising modulating information using a selected modulation coding scheme, multiplying the modulated information with a cyclically shifted sequence, and mapping the multiplied modulated information into at least one subcarrier and transmitting the mapped information on an uplink.

In another exemplary aspect of the invention, there is an integrated circuit comprising a first circuit configured to modulate information using a selected modulation coding scheme, a second circuit configured to multiply the modulated information with a cyclically shifted sequence, and a third circuit configured to map the multiplied modulated information into at least one subcarrier and transmit the mapped information on an uplink.

In still another exemplary aspect of the invention, there is an apparatus comprising means for modulating information using a selected modulation coding scheme, means for multiplying the modulated information with a cyclically shifted sequence, and means for mapping the multiplied modulated information into at least one subcarrier and transmitting the mapped information on an uplink.

Wherein the exemplary aspect of the invention above, the means for modulating and the means for multiplying comprise a sequence modulator coupled to a multiplier, and the means for mapping and transmitting comprise a mapper coupled to a transmitter.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 2:
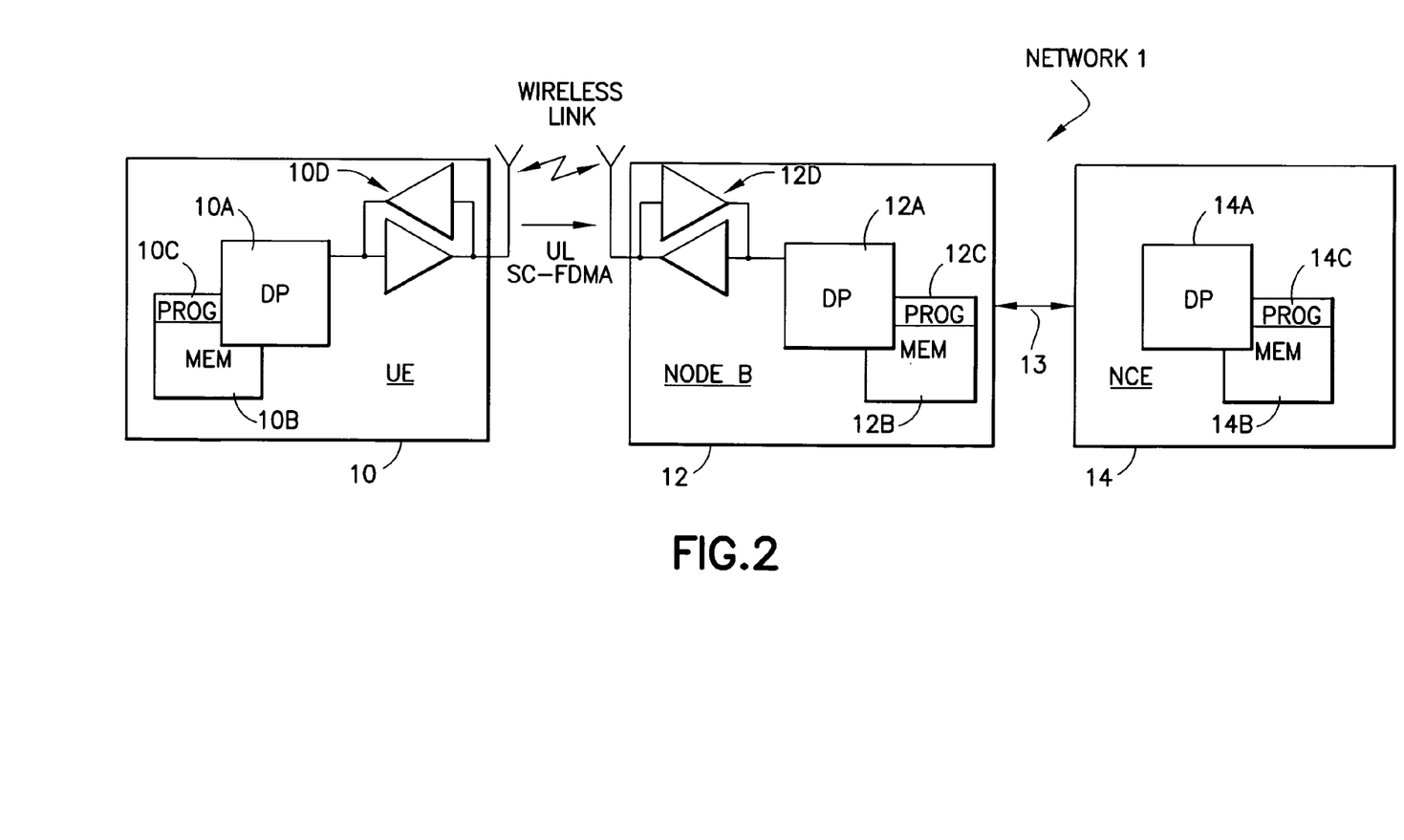
FIG. 2 shows a simplified block diagram of various electronic devices that are suitable for use in practicing the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with a UE 10 via at least one Node B (base station) 12 (also referred to herein as an eNode B 12). The network 1 may include a network control element 14 coupled to the eNode B 12 via a data link 13. The UE 10 includes a data processor (DP) 10A, a memory (MEM) 10B that stores a program (PROG) 10C, and a suitable radio frequency (RF) transceiver 10D for bidirectional wireless communications with the eNode B 12, which also includes a DP 12A, a MEM 12B that stores a PROG 12C, and a suitable RF transceiver 12D. The eNode B 12 is typically coupled via the data path 13 to the network control element 14 that also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 10A of the UE 10 and the other DPs, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 3:
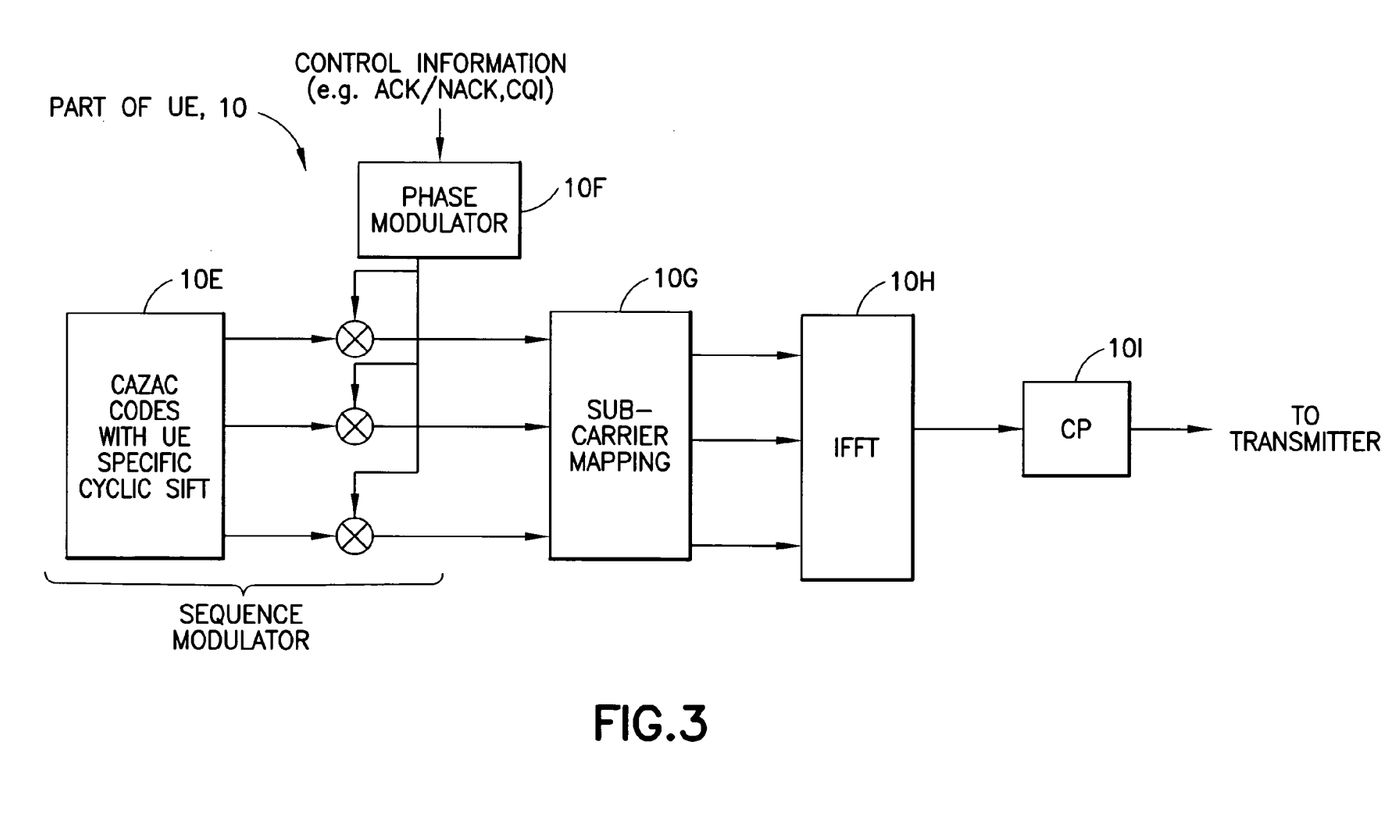
FIG. 3 illustrates a block diagram of circuitry that forms a part of the UE of FIG. 2.

The exemplary embodiments of this invention provide a novel transmission format for DL control signaling that is transmitted in the UL. Referring to FIG. 3, there is shown a block diagram of circuitry that forms a part of the UE 10 of FIG. 2. A sequence modulator receives encoded control information bits to be transmitted. The encoded control information bits are applied to an input to a phase modulator unit 10F. The output of a reference signal (or sequence) generator such as a CAZAC codes unit 10E is applied to a bank of multipliers that form a part of the phase modulator 10F. The CAZAC sequence is modulated by using one of, for example, BPSK, QPSK, 8 PSK or 16QAM. Each modulated CAZAC sequence forms a symbol that carries 1 bit, 2 bits, 3 bits or 4 bits, depending on the selected modulation scheme. Thus, this approach is capable of conveying not only the ACK/NACK but also other data-non-associated control signaling, e.g., FBI needed by different DL MIMO techniques, or the CQI. The modulated sequence is then applied to a sub-carrier mapping block 10G. The sub-carrier mapping performed in block 10G may be either localized or distributed. The mapped symbols are then applied to an IFFT block 10H, after which a CP is added by block 10I prior to being transmitted from the UE 10 to the Node-B 12. As an alternative to the CAZAC code the reference signal (or sequence) could be a computer search based Zero Autocorrelation sequence (ZAC). The properties of ZAC sequences are similar to CAZAC, with respect to Zero AutoCorrelation (or "nearly zero autocorrelation"). However ZAC sequences have no Constant Amplitude (this is a property of CAZAC).

There are proposed certain computer search-based ZAC-sequences to be used for demodulation reference signals in LTE UL and for sequence modulation applied on PUCCH. Currently, there are proposals to include this sequence set in the LTE standard. These sequences are disclosed in 2007E02646 FI Low PAR zero autocorrelation zone sequences for multi-code sequence modulation. In 2007E02646 FI the term RAZAC (Random ZAC) is used. However, currently this term is not fully established.

Significant advantages that can be gained through the use of the exemplary embodiments of this invention include, but are not limited to, an increased coverage for the control signaling, as the coverage gain is obtained due to a lower OBO and Eb/No requirement (see the discussion below of FIG. 6). Another advantage is a capability to multiplex several sequences orthogonally into a certain frequency band, which can be accomplished without reducing a number of allocated frequency bins (similar to an FDM type of multiplexing). This is particularly beneficial for a case where there is only data-non-associated control signals to be transmitted on the UL.

It should also be noted that the PAR properties of this signaling scheme are not dependent of the phase modulation scheme that is used.

It can be noted that any reduction in spectrum efficiency that may be experienced is minimal and can well be tolerated in the control information transmission. This is true at least for the reason that the very limited form of AMC is economical due to small amount of control information (a sufficient amount of processing gain is needed to guarantee the control channel coverage). Furthermore, and as was mentioned above, the spectrum efficiency of the sequence modulation can be significantly enhanced by allocating several UEs 10 into the same time and frequency resource by means of providing different cyclic shifts of CAZAC sequence in block 10E. Complete orthogonality between the CAZAC sequences under perfect synchronization is achieved if the length of cyclic shift is larger than the delay spread of the radio channel. The number of orthogonal cyclic shifts, assuming 5 microsecond delay spread, is 13 within one block.

It should be noted that other embodiments of this invention may employ other than CAZAC sequences such as, by example, truncated GCL (generalized, chirp-like) sequences (e.g., see K. Fazel and S. Keiser, "Multi Carrier and Spread Spectrum Systems," John Wiley and Sons, 2003).

It should be further noted that the CAZAC sequence has been agreed on to be a pilot sequence for the LTE UL. The CAZAC sequence can be generated as:

$$a_u(k) = \exp\left(-j2\pi u \frac{k^2}{N_G}\right),$$

where k is the sample index and Ng is length of CAZAC sequence.

Figure 9:
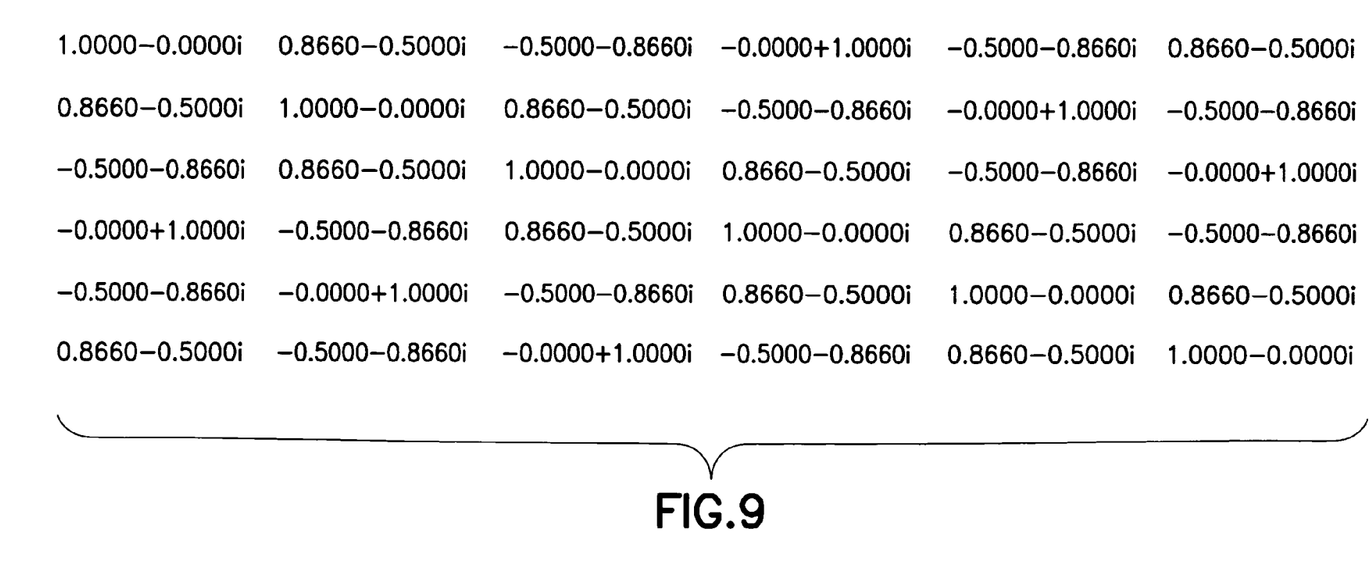
FIG. 9 depicts cyclic shifts of one exemplary CAZAC code, where different rows correspond to different cyclic shifts.

The matrix shown in FIG. 9 depicts the cyclic shifts of one exemplary CAZAC code (different rows correspond to different cyclic shifts).

It may be assumed that the Node-B 12 signals the CAZAC code cyclic shift to be used to the UE 10 (implicitly or explicitly). In case of implicit signaling certain cyclic shifts may be coupled with the allocated resource, or a DL allocation table (AT) may be used. During handover, the signaling resources are changed according to the new cell.

The exemplary embodiments of this invention can be implemented by multiplexing control signal transmissions into separate (pre-defined) blocks (block level multiplexing) when the UE 10 has both UL data and uplink data-non-associated control signaling to transmit.

When the UE 10 has only data-non-associated control signaling to be transmitted, different signals can be multiplexed by means of CDMA applying Hadamard spreading for the modulated sequences. Reference in this regard can be made to commonly owned U.S. Provisional Patent Application 60/847,414, filed on Sep. 26, 2006 herewith, entitled: "Apparatus, Method and Computer Program Product Providing Multiplexing for Data-non-associated Control Channel", by Esa Tiirola and Kari Pajukoski, the content of which is incorporated by reference herein in its entirety.

Figure 4:
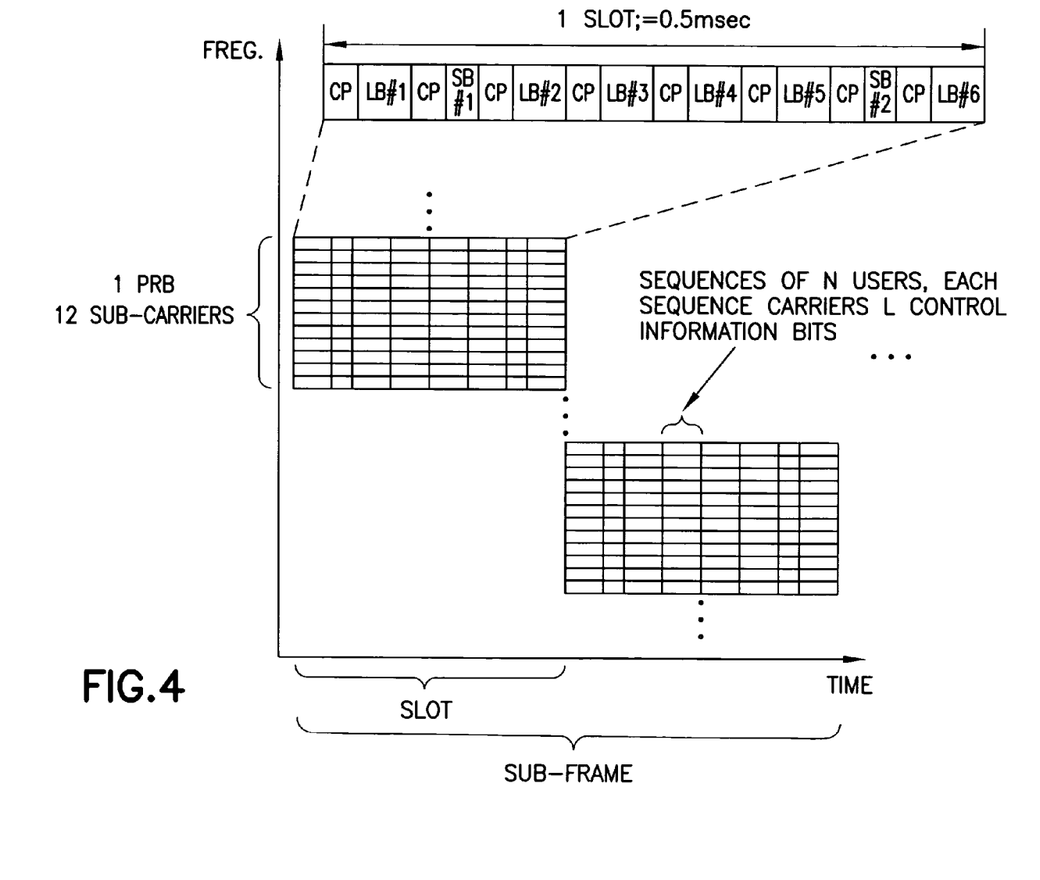
FIG. 4 shows an example of an UL multiplexing scheme in accordance with an exemplary embodiment of this invention.

FIG. 4 shows a multiplexing scheme for a case where the UE 10 has only data-non-associated control signaling (e.g. ACK/NACK, CQI) to be transmitted. A sub-frame length (formerly a TTI) of one millisecond and slot (formerly sub-frame) based frequency hopping is assumed in FIG. 4. Using the CDM-type of multiplexing it is possible to have six orthogonal pilot signals within one SB.

FIG. 4 assumes, as a non-limiting example, modulating a CAZAC sequence with six different UE-specific cyclic shifts. Thus, there are six simultaneous resources of equal size reserved for data-non-associated control signaling (within 1 PRB corresponding to a 180 kHz bandwidth allocation). Each resource is capable of conveying 1-48 bits of data-non-associated control signaling that includes only ACK/NACK, only CQI, or both ACK/NACK and CQI. However, and as was noted above, L1 feedback (FB), needed by various MIMO and closed loop beamforming techniques, may also be considered. It is further noted that a placement of RS blocks and ACK/NACK data blocks may differ from what has been presented in FIG. 4. It is further noted in the currently agreed slot format, that 3 RS blocks are in the middle of the slot, whereas 2+2 ACK/NACK symbols are in both edges of the slot.

Figure 5:
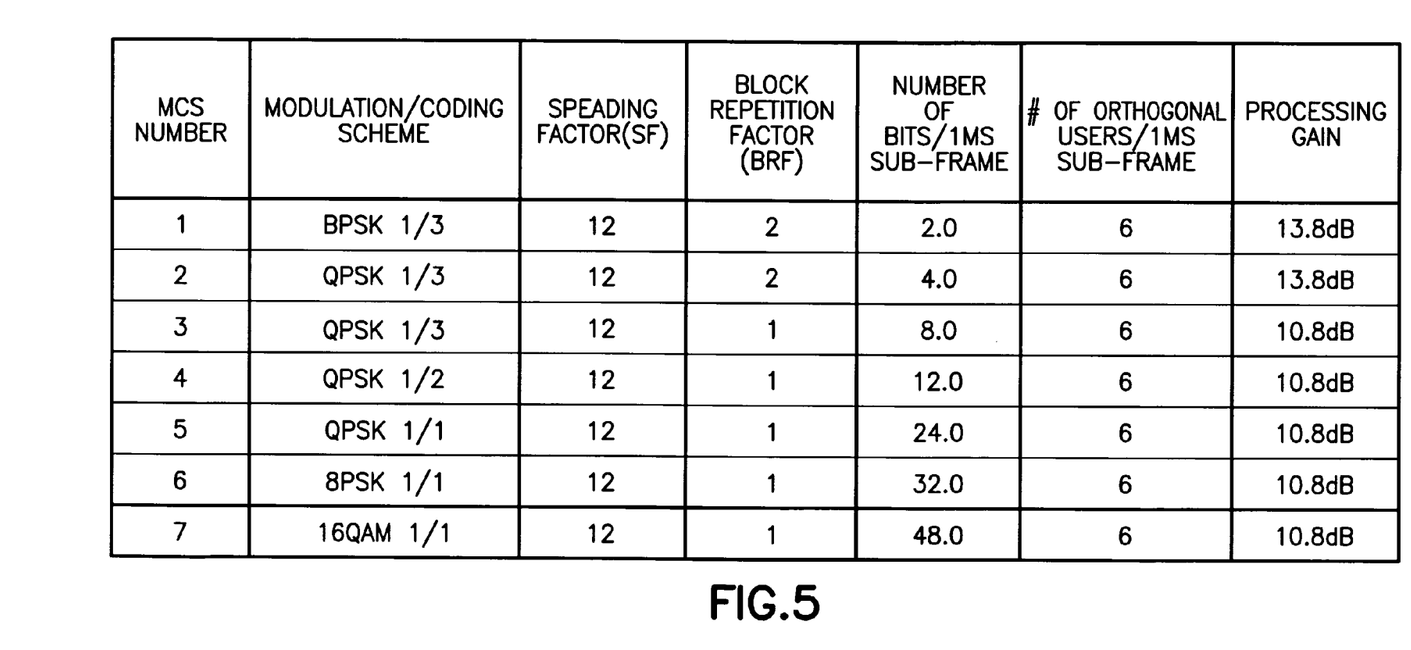
FIG. 5 illustrates a non-limiting example of a MCS set that can be employed with the UL multiplexing scheme shown in FIG. 4.

An example of one possible MCS set is shown in FIG. 5. A maximum allowed modulation and coding scheme can be based on propagation conditions, e.g., an average SINR, whereas the MCS that is actually used is based on the amount of bits in the data-non-associated control channel. It should be noted that the values shown in FIG. 5 can change, for example when one or more blocks are replaced by additional pilot signals, which can be beneficial from the channel estimation point of view.

In general, there is no need for fast (explicit) signaling between the UE 10 and the Node-B 12 in this regard. Instead, some slow signaling to indicate the applied MCS can be used. This is true at least for the reason that the selected MCS mainly depends on the amount of data to be sent (e.g., ACK/NACK or CQI) and the average radio conditions (which typically do not change rapidly). In addition, blind detection is not needed at the Node-B 12 since the Node-B 12 knows what information is being transmitted (e.g., ACK/NACK is due to the DL transmission, and CQI is typically periodic).

As was discussed above, a significant advantage that is realized by the use of the exemplary embodiments of this invention is increased transmission coverage, as the coverage area is increased because of lower OBO and Eb/No requirements.

Figure 6:
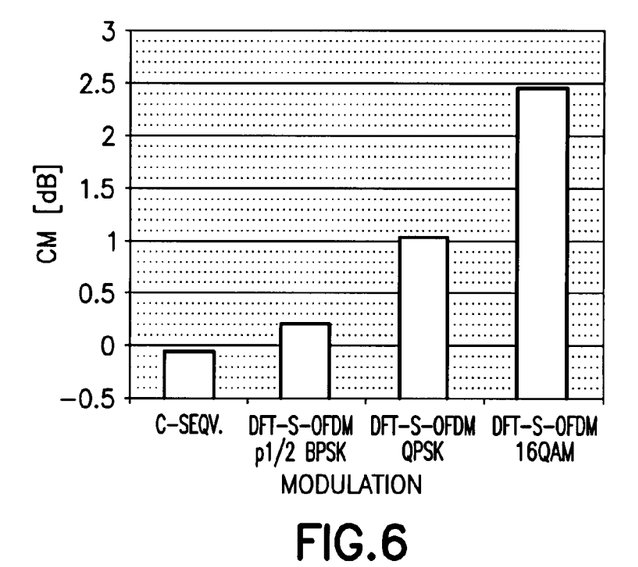
FIG. 6 is a graph that shows CM properties of sequence modulation as compared to DFT-S-OFDM.
Figure 7:
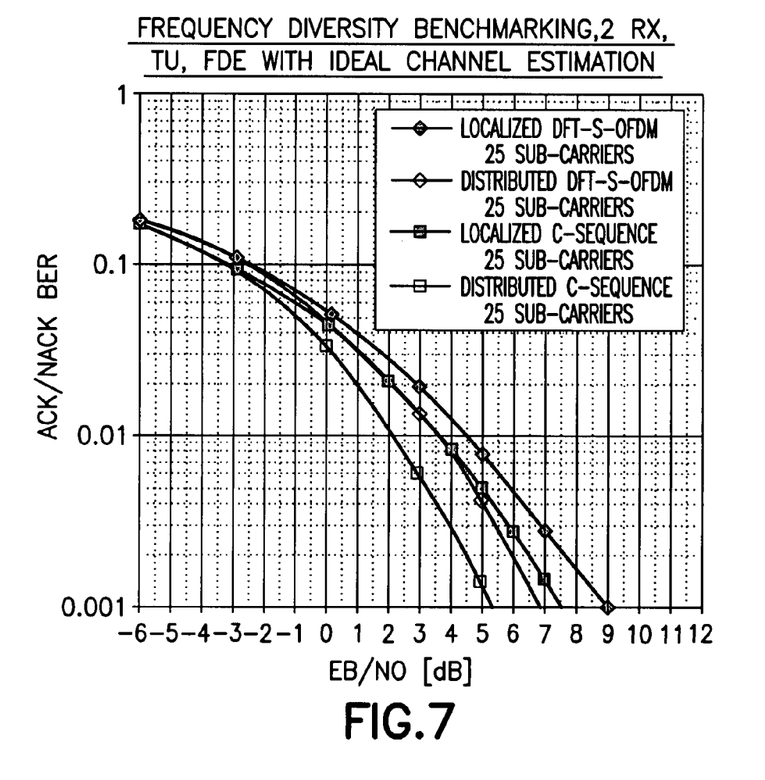
FIG. 7 is a graph that provides a comparison between the CAZAC sequence modulation approach in accordance with the exemplary embodiments of this invention and DFT-S-OFDMA.

A significant benefit that is gained by the use of the sequence modulator shown in FIG. 3 is a reduced PAR, as shown in FIG. 6, where it can be noted that the Cubic Metric illustrates the actual OBO requirement of the UE 10 transmitter.

In FIG. 6 the performance of the DFT-S-OFDMA waveform, in the sense of ACK/NACK BER, is compared with CAZAC sequence (C-Sequence) modulated waveform in accordance with the exemplary embodiments of this invention. In this comparison a frequency allocation granularity of 25 sub-carriers is assumed, and a frequency domain equalizer with ideal channel estimation is used. The DFT-S-OFDMA is implemented according to 3GPP TR 25.814 (see generally section 9.1.1). With DFT-S-OFDM the symbol level repetition is performed over 25 symbols. A sequence length of 25 symbols is used with the C-Sequence modulation. In a distributed format 25 sub-carriers are equally spaced over the 5 MHz bandwidth. As can be seen the C-Sequence modulation outperforms DFT-S-OFDM by 1.3 dB with localized sub-carrier mapping, and by 1.7 dB with distributed sub-carrier mapping. This improvement is due at least to the fact that the DFT-S-OFDMA approach suffers from non-optimum equalization, whereas the C-Sequence modulation employed by the exemplary embodiments of this invention is essentially conventional OFDM in the sense of equalization. The observed improvement is also due to the fact that DFT-S-OFDMA with symbol level repetition cannot fully exploit the frequency diversity since the frequency response is not flat. However, this characteristic is a property of the CAZAC sequences used in the sequence modulation circuitry shown in FIG. 3.

As should be appreciated, the Node-B 12 is constructed and operated so as to receive, demodulate, demultiplex and process the UL transmissions from a plurality of UEs 10 so as to extract the data-non-associated control signaling from each of the UEs 10.

In earlier discussions of LTE development, there were 12 sub-carriers corresponding to LBs and six corresponding to SBs, and six different cyclic shifts exist with CAZAC codes of length 6. The number of cyclic shifts in the pilot block limits the number of users in a given physical resource block. On the other hand, the number of cyclic shifts of the LB was double that of the SBs (i.e., there were 12 in a single physical resource block). Some of this terminology is now changed. Currently in LTE, there are typically 7 blocks in each slot (normal cyclic prefix). All of the blocks are of equal size. In current ACK/NACK setup, 3 blocks are reserved for RS (SF=3) and 4 blocks for ACK/NACK data (SF=4). It is noted than in the agreed upon ACK/NACK format, the number of RS blocks has been increased to optimize the performance of control channel transmission.

Assume that the rows in the matrix shown in FIG. 9 represent the cyclic shifts of a CAZAC code used for the pilot (SB1), and assume a similar type of matrix can be generated for LBs (there are 12 rows in that matrix). Based on these assumptions, it is within the scope of the exemplary embodiments of this invention for the allocation of cyclic shifts for SBs and LBs to be coordinated in such a manner that the allocation of code resources in the SB and LB are coupled together in accordance with the following principles (both matrices are preferably arranged in such a manner that the amount of the cyclic shift increases linearly, as in the matrix shown in FIG. 9):

the $1^{st}$ cyclic shift of SBs ($1^{st}$ row in the matrix) is paired with $1^{st}$ cyclic shift of LBs;

the $2^{nd}$ cyclic shift of SBs is paired with the $3^{rd}$ cyclic shift of LBs;

the $3^{rd}$ cyclic shift of SBs is paired with the $5^{th}$ cyclic shift of LBs;

...; and the $6^{th}$ cyclic shift of SBs is paired with the $11^{th}$ cyclic shift of LBs.

There are certain benefits that can be realized by the use of this further embodiment of the invention that include, but need not be limited to, simpler signaling and improved cross-correlation properties.

With regard to the second improvement noted above, the improved cross-correlation properties, it can be realized that the cross-correlation properties of different cyclic shifts depend not only on the delay spread of the radio channel but also on the difference in cyclic shifts of the CAZAC sequence. From the matrix shown in FIG. 9 it can be seen that two adjacent codes (rows) have a smallest window where two codes are orthogonal, whereas (for example) codes 1 and 4 (corresponding to the rows 1 and 4) have the best orthogonality in a case when the delay spread is large. As was mentioned above, a limitation exists as to the total number of pilot codes, rather than the number of cyclic shifts in the LB. Thus, it is preferred to utilize the cyclic shifts of the LB in an order such that codes which have the best cross-correlation properties with each other are used first. Using this arrangement, one may allocate only six out of 12 codes for the sequence modulated LBs.

It should be further noted that if the number of allocated resources is smaller than six (e.g., three), it is possible to utilize only the best codes also for the pilot signals (the corresponding code pairs are selected for the LBs). The order of utilization can be extended to the network level in such a way that the orthogonal resources are utilized in a predetermined order in different cells, e.g., according to the predetermined frequency reuse pattern. The goal of this arrangement is that when the utilization of control resources is low, then the interference caused by the control channels is minimized (orthogonal resources are used in neighboring cells). Furthermore, in order to minimize the cross-correlation properties of the CAZAC codes, different CAZAC sequences may be used in different cells.

One further benefit of sequence modulation is that it is possible to adjust the pilot power simply by allocating a predetermined LB(s) for the pilot. This can be done orthogonally without generating additional interference for those UEs transmitting the control information bits using modulated cyclic shifts of the same CAZAC sequence.

Based on the foregoing description it should be appreciated that the exemplary embodiments of this invention provide an UL waveform that is well suited for conveying data-non-associated control signaling from the UE 10.

Based on the foregoing it should be apparent that the exemplary embodiments of this invention provide, in a non-limiting aspect thereof, a method, apparatus and computer program product(s) to provide an enhanced data-non-associated control signaling procedure for use on the single carrier, frequency division multiple access uplink in an evolved UTRAN wireless communication system.

Figure 8:
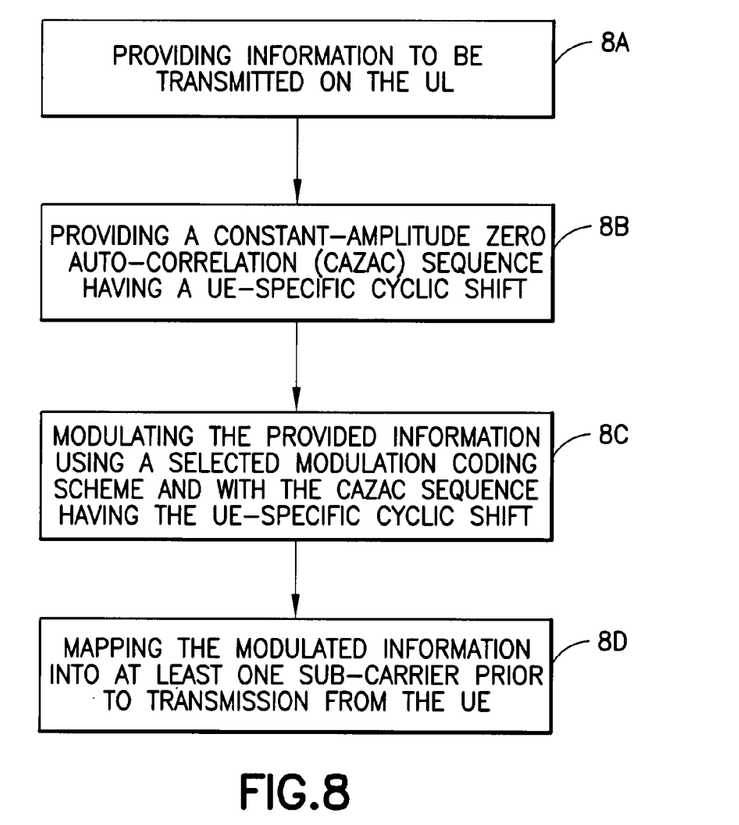
FIG. 8 is a logic flow diagram that is illustrative of a method, and the operation of a computer program product, for the UE shown in FIGS. 2 and 3.

FIG. 8 is a logic flow diagram that is illustrative of a method, and the operation of a computer program product, for the UE 10 shown in FIGS. 2 and 3. The method includes providing information to be transmitted on the UL (Block 8A), and providing a constant-amplitude zero auto-correlation sequence having a UE-specific cyclic shift (Block 8B). In addition, the method includes modulating the provided information using a selected modulation coding scheme and with the constant-amplitude zero auto-correlation sequence having the UE-specific cyclic shift (Block 8C), and mapping the modulated information into at least one sub-carrier prior to transmission from the UE (Block 8D).

In the method (and computer program product) of the previous paragraph the selected modulation and coding scheme comprises using one of phase shift keying and quadrature amplitude modulation, and where a modulation coding scheme defined for generating an UL waveform is comprised of DFT-S-OFDMA.

In the method (and computer program product) of the previous paragraphs the modulation and coding scheme is selected based at least in part on an amount of the information to be transmitted on the UL.

In the method (and computer program product) of the previous paragraphs the modulation and coding scheme is selected based at least in part on channel conditions between the UE and a base station.

In the method (and computer program product) of the previous paragraphs, UL transmissions from a plurality of UEs are multiplexed simultaneously into a same slot (formerly sub-frame).

In the method (and computer program product) of the previous paragraphs the provided information may comprise only ACK/NACK information, only CQI information, or both ACK/NACK and CQI information. However, it should be noted that L1 feedback (FB), needed by various MIMO and closed loop beamforming techniques, may also be considered.

Figure 10:
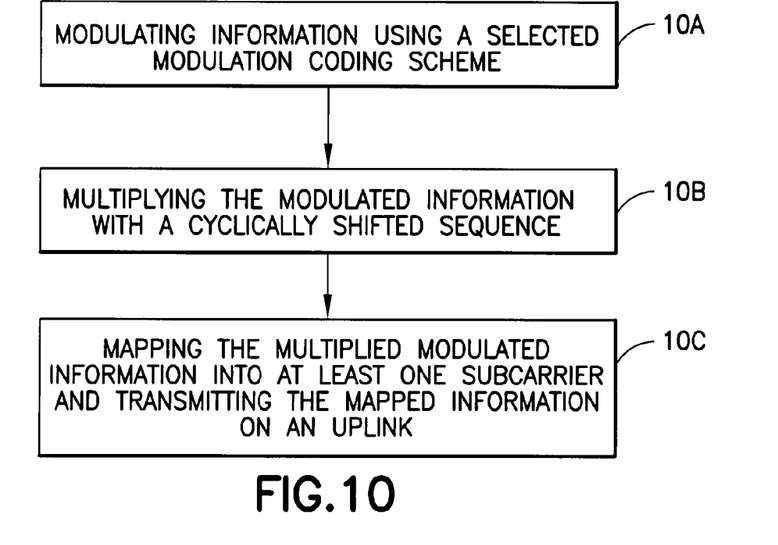
FIG. 10 is a logic flow diagram that is illustrative of a method in accordance with an exemplary embodiment of this invention.

FIG. 10 is a logic flow diagram that is illustrative of a method in accordance with an exemplary embodiment of this invention. The method includes modulating information using a selected modulation coding scheme (Block 10A), multiplying the modulated information with a cyclically shifted sequence (Block 10B), and mapping the multiplied modulated information into at least one subcarrier and transmitting the mapped information on an uplink (Block 10C).

The various blocks shown in FIGS. 8 and 10 may be viewed as method steps, and/or as operations that result from operation of computer program code, and/or as a plurality of coupled logic circuit elements constructed to carry out the associated function(s).

Further in accordance with the exemplary embodiments of this invention there is provided a UE that comprises a sequence modulator comprised of circuitry, responsive to a presence of information to be transmitted on the UL, to modulate the information using a selected modulation coding scheme and with a constant-amplitude zero auto-correlation sequence having a UE-specific cyclic shift. The UE further comprises circuitry to map the modulated information into a plurality of sub-carriers prior to transmission from the UE.

In the UE of the previous paragraph the selected modulation and coding scheme comprises using one of phase shift keying and quadrature amplitude modulation, and a modulation coding scheme defined for generating an UL waveform is comprised of DFT-S-OFDMA.

In the UE of the previous paragraphs the modulation and coding scheme is selected based at least in part on an amount of the information to be transmitted on the UL.

In the UE of the previous paragraphs the modulation and coding scheme is selected based at least in part on channel conditions between the UE and a base station.

In the UE of the previous paragraphs, where UL transmissions from a plurality of UEs are multiplexed simultaneously into a same slot (formerly sub-frame).

In the UE of the previous paragraphs the provided information comprises only ACK/NACK information, only CQI information, or both ACK/NACK and CQI information.

In the UE of the previous paragraphs the provided information comprises MIMO-related feedback information.

In the UE of the previous paragraphs at least a portion of the circuitry is embodied in one or more integrated circuit packages or modules.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, and as was noted above, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

In addition, the term "coupled" as used herein is not intended to be limited to a direct connection between recited components, but encompasses a disposition wherein there may be one or more intervening components or elements between the recited ones.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   modulating control information bits using a selected modulation coding scheme;
   multiplying the modulated control information bits with a cyclically shifted zero autocorrelation sequence to create a modulated sequence; and
   mapping the modulated sequence into at least one subcarrier and transmitting the mapped modulated sequence on an uplink.

2. The method of claim 1, where the cyclically shifted zero autocorrelation sequence is a constant amplitude zero autocorrelation sequence.

3. The method of claim 2, where the constant amplitude zero autocorrelation sequence is generated as a plurality of complex values.

4. The method of claim 1, where the selected modulation coding scheme comprises using one of binary phase shift keying and quadrature phase shift keying.

5. The method of claim 1, where the selected modulation coding scheme is selected based at least in part on an amount of the information to be transmitted on the uplink.

6. The method of claim 1, where the selected modulation coding scheme is selected based at least in part on channel conditions between a user equipment and a base station.

7. The method of claim 1, where the mapped modulated sequence transmitted on the uplink is multiplexed simultaneously into a same slot.

8. The method of claim 1, where the control information bits comprise at least one of acknowledgment information, negative acknowledgment information, channel quality indicator information, and scheduling request information.

9. The method of claim 1, performed by a user equipment.

10. The method as in claim 9, where the cyclically shifted zero autocorrelation sequence is specific to the user equipment.

11. The method of claim 9, where a cyclic shift of the cyclically shifted zero autocorrelation sequence is unique to the user equipment.

12. The method of claim 11, where a cyclic shift difference between the user equipment and another user equipment allocated to an adjacent cyclic shift is determined by characteristics of a radio channel.

13. The method of claim 1, where a zero autocorrelation sequence is generated as a plurality of complex values and where the complex values are shifted in order to cyclically shift the zero autocorrelation sequence to create the cyclically shifted zero autocorrelation sequence.

14. The method of claim 1, where the control information bits comprise data-non-associated control signaling.

15. An apparatus, comprising:
   at least one data processor; and
   at least one memory including at least one computer program code, where the at least one memory and the at least one computer program code are configured, with the at least one data processor, to cause the apparatus to:
   provide a cyclically shifted zero autocorrelation sequence;
   modulate control information bits using a selected modulation coding scheme;
   multiply the modulated control information bits with the cyclically shifted zero autocorrelation sequence to create a modulated sequence; and
   map the modulated sequence into at least one subcarrier and transmit the mapped modulated sequence on an uplink.

16. The apparatus of claim 15, where the cyclically shifted zero autocorrelation sequence is a constant amplitude zero autocorrelation sequence.

17. The apparatus of claim 16, where the constant amplitude zero autocorrelation sequence is generated as a plurality of complex values.

18. The apparatus of claim 15, where the selected modulation coding scheme comprises one of binary phase shift keying and quadrature phase shift keying.

19. The apparatus of claim 15, where the selected modulation coding scheme is selected based at least in part on an amount of the information to be transmitted on the uplink.

20. The apparatus of claim 15, where the selected modulation coding scheme is selected based at least in part on channel conditions between the apparatus and a base station.

21. The apparatus of claim 15, where the control information bits comprise at least one of acknowledgment information, negative acknowledgment information, channel quality indicator information, and scheduling request information.

22. A non-transitory computer readable medium encoded with program instructions executable by a processor to perform actions comprising:
    modulating c information bits using a selected modulation coding scheme;
    multiplying the modulated control information bits with a cyclically shifted zero autocorrelation sequence to create a modulated sequence; and
    mapping the modulated sequence into at least one subcarrier and transmitting the mapped modulated sequence on an uplink.

23. The non-transitory computer readable medium encoded with the program instructions of claim 22, where the cyclically shifted zero autocorrelation sequence is a constant amplitude zero autocorrelation sequence.

24. The non-transitory computer readable medium encoded with the program instructions of claim 23, where the constant amplitude zero autocorrelation sequence is generated as a plurality of complex values.

25. An integrated circuit, comprising:
    a first circuit configured to modulate control information bits using a selected modulation coding scheme;
    a second circuit configured to multiply the modulated control information bits with a cyclically shifted zero autocorrelation sequence to create a modulated sequence; and
    a third circuit configured to map the modulated sequence into at least one subcarrier and transmit the mapped modulated sequence on an uplink.

26. The integrated circuit of claim 25, where the cyclically shifted zero autocorrelation sequence is a constant amplitude zero autocorrelation sequence.

27. The integrated circuit of claim 26, further comprising a fourth circuit configured to generate the constant amplitude zero autocorrelation sequence as a plurality of complex values.

* * * * *

UNITED STATES PATENT AND TRADEMARK OFFICE
CERTIFICATE OF CORRECTION

| | |
|---|---|
| PATENT NO. | : 8,599,940 B2 |
| APPLICATION NO. | : 11/904509 |
| DATED | : December 3, 2013 |
| INVENTOR(S) | : Kari Pajukoski and Esa Tiirola |

Page 1 of 1

It is certified that error appears in the above-identified patent and that said Letters Patent is hereby corrected as shown below:

IN THE CLAIMS:

In Claim 22, Column 13, line 24, delete "c" and replace with --control--.

Signed and Sealed this
Twenty-fifth Day of March, 2014

Michelle K. Lee
*Deputy Director of the United States Patent and Trademark Office*